US011708806B2

(12) United States Patent
Kimura

(10) Patent No.: US 11,708,806 B2
(45) Date of Patent: Jul. 25, 2023

(54) HYBRID VEHICLE CONTROL METHOD AND HYBRID VEHICLE CONTROL DEVICE

(71) Applicant: Nissan Motor Co., Ltd., Yokohama (JP)

(72) Inventor: Yoshiyasu Kimura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 44 days.

(21) Appl. No.: 17/604,456

(22) PCT Filed: Apr. 19, 2019

(86) PCT No.: PCT/IB2019/000429
§ 371 (c)(1),
(2) Date: Oct. 18, 2021

(87) PCT Pub. No.: WO2020/212719
PCT Pub. Date: Oct. 22, 2020

(65) Prior Publication Data
US 2022/0213851 A1 Jul. 7, 2022

(51) Int. Cl.
*F02M 25/08* (2006.01)
*B60W 20/16* (2016.01)
(Continued)

(52) U.S. Cl.
CPC .......... *F02M 25/0836* (2013.01); *B60K 6/24* (2013.01); *B60W 20/16* (2016.01); *F01N 3/2013* (2013.01);
(Continued)

(58) Field of Classification Search
CPC .............. F02N 11/0814; F02M 25/836; F02M 25/089; B60W 20/16; B60K 6/24;
(Continued)

(56) References Cited

U.S. PATENT DOCUMENTS 9,656,666 B2 * 5/2017 Wang .................. B60W 30/192
9,937,786 B2 4/2018 Dudar et al.
(Continued)

FOREIGN PATENT DOCUMENTS

JP 4-252852 A 9/1992
JP 5-312109 A 11/1993
(Continued)

*Primary Examiner* — Gonzalo Laguarda
(74) *Attorney, Agent, or Firm* — Global IP Counselors, LLP

(57) ABSTRACT

A hybrid vehicle includes a canister that adsorbs evaporative fuel generated in the fuel tank for an internal combustion engine. The hybrid vehicle can drive a drive wheel even when the internal combustion engine is stopped. When the internal combustion engine of the hybrid vehicle is stopped and a prescribed set of conditions is satisfied, the internal combustion engine is rotated by the generator. When the internal combustion engine of the hybrid vehicle is rotated by the generator, the evaporative fuel adsorbed in the canister is supplied to the upstream side of an upstream side exhaust catalytic converter device. In the hybrid vehicle, the introduced evaporative fuel as reducing agent is adsorbed in the upstream side exhaust catalytic converter device and a downstream side exhaust catalytic converter device.

12 Claims, 7 Drawing Sheets

(51) Int. Cl.
  *B60K 6/24*    (2007.10)
  *F01N 3/20*    (2006.01)
  *F02D 41/00*   (2006.01)
  *F02D 41/02*   (2006.01)
  *B60W 10/06*   (2006.01)
  *B60W 10/08*   (2006.01)
  *F02D 41/04*   (2006.01)

(52) U.S. Cl.
  CPC ....... *F01N 3/2033* (2013.01); *F02D 41/0035* (2013.01); *F02D 41/0045* (2013.01); *F02D 41/0275* (2013.01); *F02M 25/089* (2013.01); *B60W 10/06* (2013.01); *B60W 10/08* (2013.01); *B60W 2710/0644* (2013.01); *F02D 41/042* (2013.01); *F02D 2250/24* (2013.01)

(58) Field of Classification Search
  CPC .. F01N 3/2013; F01N 3/2033; F02D 41/0035; F02D 41/0045; F02D 41/0275
  See application file for complete search history.

(56) References Cited

U.S. PATENT DOCUMENTS

| | | | |
|---|---|---|---|
| 2013/0081600 A1* | 4/2013 | Fukui | F02D 41/0042 123/520 |
| 2019/0107081 A1 | 4/2019 | Dudar | |

FOREIGN PATENT DOCUMENTS

| | | |
|---|---|---|
| JP | 2000-257473 A | 9/2000 |
| JP | 2000-282917 A | 10/2000 |
| JP | 2012-225231 A | 11/2012 |
| JP | 2014-15876 A | 1/2014 |

* cited by examiner

HYBRID VEHICLE CONTROL METHOD AND HYBRID VEHICLE CONTROL DEVICE

CROSS-REFERENCE TO RELATED APPLICATIONS

This application is a U.S. national stage application of International Application No. PCT/IB2019/000429, filed on Apr. 19, 2019.

BACKGROUND

Technical Field

The present invention relates to a hybrid vehicle control method and a hybrid vehicle control device.

Background Information

Evaporative fuel generated in a fuel tank is adsorbed in a canister mounted in a vehicle. The evaporative fuel adsorbed in the canister is purged and supplied to an internal combustion engine, or the like, when a prescribed set of conditions is satisfied.

For example, in Japanese Laid open application No. 2000-282917 (Patent Document 1), when the operating state shifts from a lean operating region, in which the air-fuel ratio is greater than a theoretical air-fuel ratio, to a rich operating region, in which the air-fuel ratio is below the theoretical air-fuel ratio, the evaporative fuel adsorbed in the canister is introduced into an intake system.

In Patent Document 1, by introducing the evaporative fuel adsorbed in the canister into the intake system, the NOx that is adsorbed on the NOx catalytic converter is released to restore (refresh) the function of the NOx catalytic converter and to reduce the NOx released from the NOx catalytic converter. The NOx catalytic converter of Patent Document 1 is arranged in the exhaust system of the internal combustion engine and absorbs NOx in an oxygen-rich atmosphere, and releases NOx as the oxygen concentration decreases.

However, in Patent Document 1, the evaporative fuel adsorbed in the canister is purged during the operation of the internal combustion engine (self-sustaining operation) and introduced into the intake passage.

Therefore, for example, when there are few opportunities for an internal combustion engine mounted in a hybrid vehicle to operate during vehicle travel, a forced purging of the canister will take place during operation of the internal combustion engine, so that the exhaust performance and combustion stability of the internal combustion engine may deteriorate due to the evaporative fuel introduced by means of the purge.

In other words, in a hybrid vehicle equipped with an internal combustion engine, there is potential to improve the processing of the evaporative fuel generated in the fuel tank.

SUMMARY

A hybrid vehicle according to the present invention has a canister that adsorbs the evaporative fuel that is generated in the fuel tank of the internal combustion engine, and the drive wheels of the hybrid vehicle can be driven even while the internal combustion engine is stopped. In the hybrid vehicle, when the internal combustion engine is stopped during operation of the vehicle and a prescribed set of conditions is satisfied, the electric motor connected to the internal combustion engine will rotate the internal combustion engine, and the evaporative fuel adsorbed in the canister will be introduced on the upstream side of the exhaust purification catalytic converter provided in the exhaust passage of the internal combustion engine. The hybrid vehicle then causes the evaporative fuel that has been introduced as a reducing agent to be adsorbed on the catalytic converter.

As a result, it becomes possible for the hybrid vehicle to supply the evaporative fuel as a reducing agent to the exhaust purification catalytic converter before the internal combustion engine starts up.

Therefore, the hybrid vehicle is able to suppress a deterioration of combustion stability and exhaust performance of the internal combustion engine caused by the evaporative fuel introduced by means of purging, and to secure exhaust gas purification performance of the exhaust purification catalytic converter when the internal combustion engine starts up (self-sustaining operation).

BRIEF DESCRIPTION OF THE DRAWINGS

Referring now to the attached drawings which form a part of this original disclosure.

DETAILED DESCRIPTION OF EMBODIMENTS

An embodiment of the present invention will be described in detail below based on the drawings.

Figure 1:
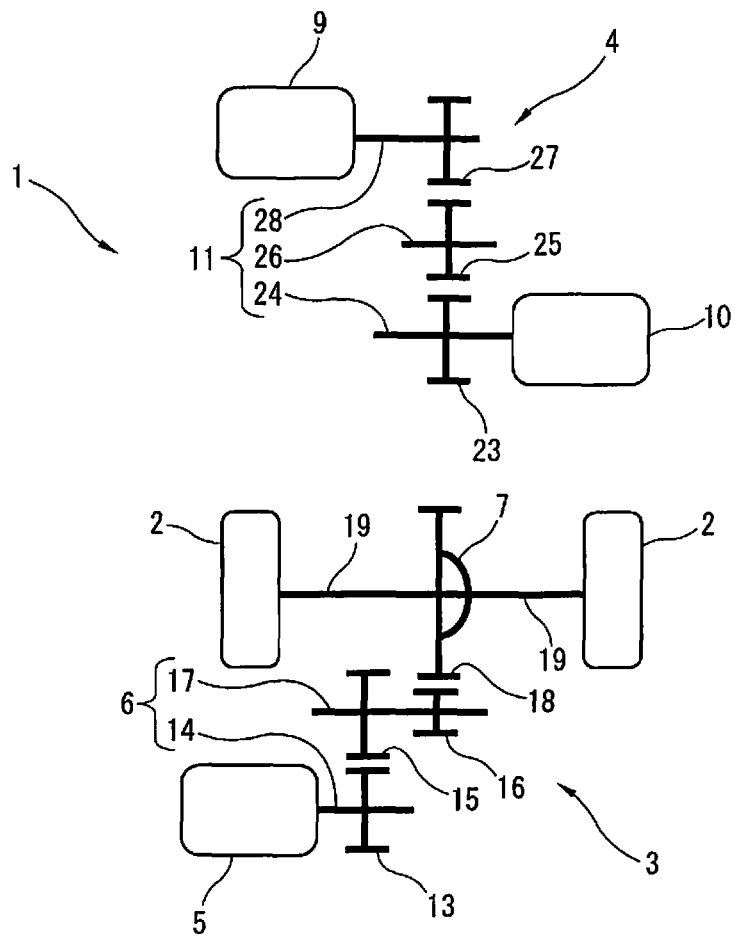
FIG. 1 is an explanatory diagram schematically illustrating an outline of a drive system of a hybrid vehicle to which the present invention is applied.
Figure 2:
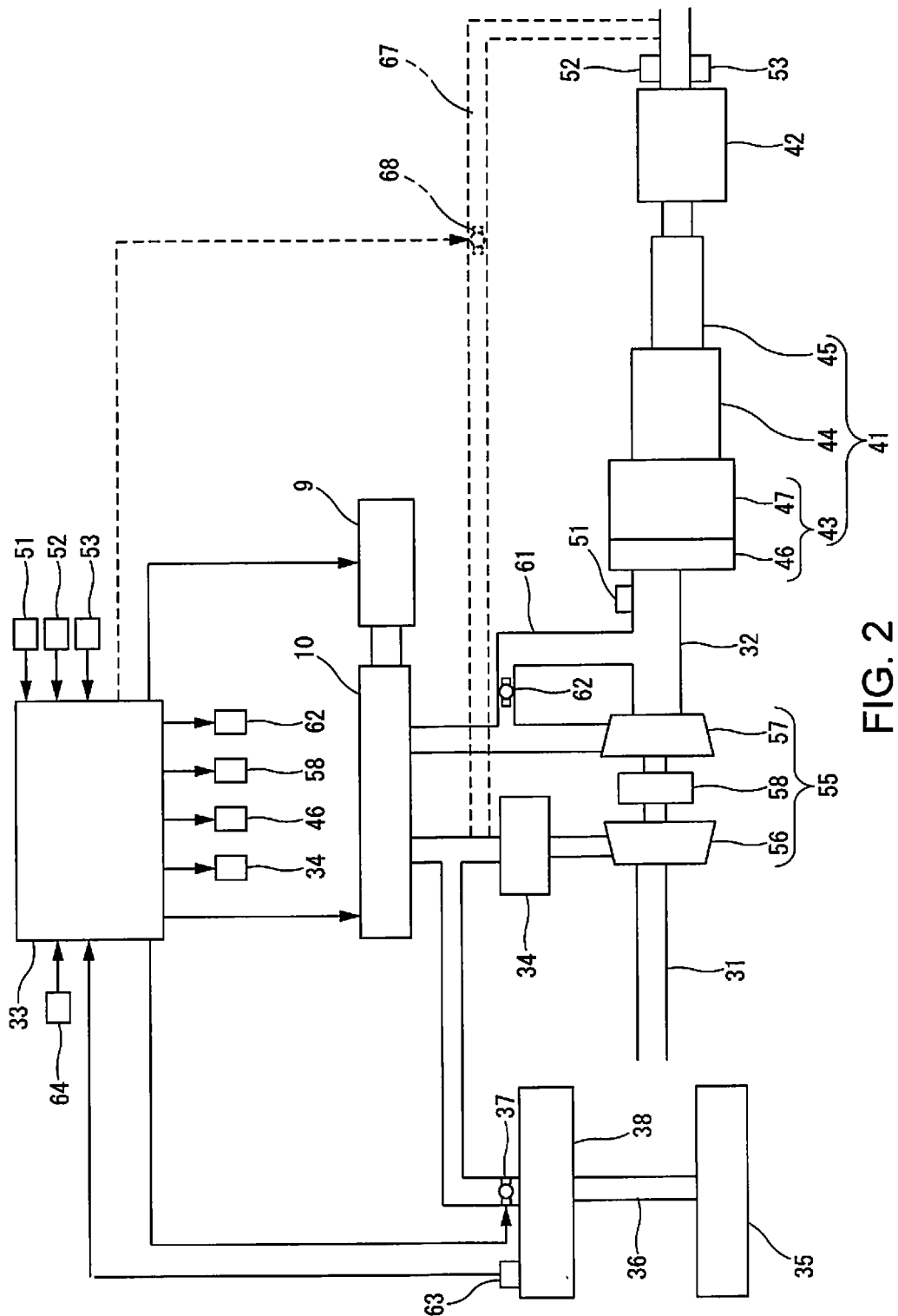
FIG. 2 is an explanatory diagram schematically illustrating an outline of a system configuration of an internal combustion engine mounted in a hybrid vehicle in a first embodiment of the present invention.

FIG. 1 is an explanatory diagram schematically illustrating an outline of the drive system of a hybrid vehicle 1 to which the present invention is applied. FIG. 2 is an explanatory diagram schematically illustrating an outline of the system configuration of an internal combustion engine 10 mounted in the hybrid vehicle 1 in a first embodiment of the present invention.

The hybrid vehicle 1 has a drive unit 3 that drives drive wheels 2 and a power generation unit 4 that generates electric power for driving the drive wheels 2.

The drive unit 3 has a drive motor 5 that rotationally drives the drive wheels 2, and a first gear train 6 and a differential gear 7 that transmit the driving force of the drive motor 5 to the drive wheels 2. The drive motor 5 is supplied with electric power from a not-shown battery charged by the power generated by the power generation unit 4.

The power generation unit 4 has a generator 9 that can act as an electric motor that generates the power to be supplied to the drive motor 5, the internal combustion engine 10 that drives the generator 9, and a second gear train 11 that transmits the rotation of the internal combustion engine 10 to the generator 9.

The hybrid vehicle 1 according to the present embodiment is a so-called series hybrid vehicle that does not use the internal combustion engine 10 to power the vehicle. That is, in the hybrid vehicle 1 according to the present embodiment, the internal combustion engine 10 is dedicated to power generation, and the drive motor 5 drives the drive wheels 2 to run the vehicle. That is, the hybrid vehicle 1 according to the present embodiment can drive the drive wheels 2 even if the internal combustion engine 10 is stopped. For example, in the hybrid vehicle 1 according to the present embodiment, when the remaining battery capacity (remaining charge) of the battery is low, the internal combustion engine 10 is driven and the generator 9 generates power in order to charge the battery.

The drive motor 5 acts as a direct drive source for the vehicle, and is driven by AC power from the battery. For example, the drive motor 5 can be a synchronous motor with a permanent magnet rotor.

In addition, the drive motor 5 functions as a generator when the vehicle decelerates. That is, the drive motor 5 is a power generation motor that can charge the battery using the regenerative energy as electric power when the vehicle decelerates.

The first gear train 6 is for decelerating the rotation of the drive motor 5 and increasing the motor torque to secure the travel drive torque.

The first gear train 6 is, for example, a gear train with two-stage deceleration, and includes a motor shaft 14 equipped with a drive unit first gear 13, and a first idler shaft 17 equipped with a drive unit second gear 15 and a drive unit third gear 16. The motor shaft 14 is a rotary shaft of the drive motor 5.

The drive unit first gear 13 engages with the drive unit second gear 15.

The drive unit third gear 16 engages with an input-side gear 18 provided on the input side of the differential gear 7.

The differential gear 7 transmits the drive torque input from the first gear train 6 via the input-side gear 18 to the left and right drive wheels 2, 2 via left and right drive shafts 19, 19. The differential gear 7 can transmit the same drive torque to the left and right drive wheels 2, 2 while allowing a difference in the rotational speeds of the left and right drive wheels 2, 2.

The generator 9 comprises a synchronous motor with a permanent magnet rotor. The generator 9 converts the rotational energy generated by the internal combustion engine 10 into electrical energy and, for example, charges the battery described above. In addition, the generator 9 functions as an electric motor that rotates the internal combustion engine 10, and functions as a starter motor when the internal combustion engine 10 is started. That is, the generator 9 acts as a power generation motor that can supply the generated electric power to the battery and that can be rotationally driven by means of the electric power from the battery.

The electric power generated by the generator 9 may be, for example, directly supplied to the drive motor 5 instead of charging the above-described battery in accordance with the driving state. In addition, the internal combustion engine 10 may be configured to be started by a dedicated starter motor that is not the generator 9.

The second gear train 11 is a gear train that connects the internal combustion engine 10 and the generator 9. That is, the internal combustion engine 10 and the generator 9 are mechanically connected. The second gear train 11 has an engine shaft 24 equipped with a power generation unit first gear 23, a second idler shaft 26 equipped with a power generation unit second gear 25, and a generator input shaft 28 equipped with a power generation unit third gear 27.

At the time of the power generation operation, the second gear train 11 increases the rotational speed of the internal combustion engine 10 to transmit the required engine torque to the generator 9. When the generator 9 functions as a starter, the second gear train 11 reduces the rotational speed of the generator 9 to transmit the required motor torque to the internal combustion engine 10.

The engine shaft 24 rotates synchronously with a crankshaft (not shown) of the internal combustion engine 10. The generator input shaft 28 rotates synchronously with a rotor (not shown) of the generator 9.

The power generation unit first gear 23 engages with the power generation unit second gear 25. The power generation unit third gear 27 engages with the power generation unit second gear 25. That is, the power generation unit first gear 23 and the power generation unit third gear 27 engage with the power generation unit second gear 25.

FIG. 2 is an explanatory diagram schematically illustrating the system configuration of the internal combustion engine 10 of the first embodiment.

The internal combustion engine 10 is a so-called reciprocating internal combustion engine, which converts the reciprocating linear motion of the pistons (not shown) into the rotary motion of a crankshaft (now shown) and extracts it as power.

The generator 9 is connected to the internal combustion engine 10. The generator 9 thus generates electrical power by rotating the internal combustion engine 10.

The internal combustion engine 10 has an intake passage 31 and an exhaust passage 32.

An electric throttle valve 34, the degree of opening of which is controlled by a control signal from a control unit 33, is provided in the intake passage 31. The throttle valve 34 controls the amount of intake air.

A purge passage 36 for introducing the evaporative fuel generated in a fuel tank 35 is connected to the intake passage 31. The purge passage 36 is connected to the intake passage 31 downstream of the throttle valve 34.

The purge passage 36 is provided with a purge control valve 37 and a canister 38.

The canister 38 adsorbs the evaporative fuel generated in the fuel tank 35. The purge control valve 37 is disposed downstream of the canister 38.

An upstream side exhaust catalyst device 41, and a downstream side exhaust catalyst device 42 positioned downstream of the upstream side exhaust catalyst device 41 are provided in the exhaust passage 32. The upstream side exhaust catalyst device 41 and the downstream side exhaust catalyst device 42 are exhaust purification catalytic converters.

The upstream side exhaust catalyst device 41 comprises a first catalytic converter 43, a second catalytic converter 44, which is a three-way catalytic converter, and a third catalytic converter 45, which is an NOx trap catalytic converter that are series-connected. The second catalytic converter 44 is positioned downstream of the first catalytic converter 43. The third catalytic converter 45 is positioned downstream of the second catalytic converter 44.

The first catalytic converter 43 comprises a fourth catalytic converter 46, which is an electric heating catalytic converter, and a fifth catalytic converter 47, which is an NOx trap catalytic converter that are series-connected. The fourth catalytic converter 46 is positioned upstream of the fifth catalytic converter 47.

The first catalytic converter 43 may be a series-connected electric heating catalytic converter and a three-way catalytic converter. In this case, the electric heating catalytic converter is positioned upstream of the three-way catalytic converter.

The electric heating generates heat when energized. The energization of the fourth catalytic converter 46, which is an electric heating catalytic converter, is controlled by the control unit 33. The NOx trap catalytic converter traps NOx (nitrogen oxides) in the exhaust when the exhaust air-fuel ratio is lean, and reduces and purifies the trapped NOx when the exhaust air-fuel ratio is at or below the theoretical value, using the HC (hydrocarbons) and CO in the exhaust as reducing agents.

The three-way catalytic converter can simultaneously purify the NOx, HC, and CO in the exhaust with maximum conversion efficiency when the air-fuel ratio is within a so-called window centered at the theoretical air-fuel ratio.

An A/F sensor 51 is disposed upstream to the upstream side exhaust catalyst device 41. The A/F sensor 51 is a so-called wide range air-fuel ratio sensor that has a substantially linear output characteristic with respect to the exhaust air-fuel ratio.

The downstream side exhaust catalyst device 42 is a so-called underfloor catalytic converter located for instance beneath the floor of the vehicle, and comprises a three-way catalytic converter, for example.

An oxygen sensor 52 and an NOx sensor 53 are disposed downstream of the downstream side exhaust catalyst device 42. The oxygen sensor 52 detects only rich or lean air-fuel ratios by changing the output voltage ON/OFF (rich, lean) over a narrow range near the theoretical air-fuel ratio. The NOx sensor 53 is a sensor for detecting NOx concentrations.

In addition, the internal combustion engine 10 has a turbocharger 55 serving as a supercharger. The turbocharger 55 includes a compressor 56 provided coaxially with the intake passage 31 and an exhaust turbine 57 provided coaxially with the exhaust passage 32. The turbocharger 55 has an electric motor 58 serving as a supercharger electric motor that can rotationally drive the compressor 56.

The compressor 56 is disposed upstream of the throttle valve 34. The compressor 56 is disposed downstream of an air flow meter, not shown. The exhaust turbine 57 is disposed upstream of the upstream side exhaust catalyst device 41. The compressor 56 can be driven by the exhaust turbine 57 and the electric motor 58.

An exhaust bypass passage 61 that bypasses the exhaust turbine 57 and connects the upstream side and the downstream side of the exhaust turbine 57 is connected to the exhaust passage 32. The downstream end of the exhaust bypass passage 61 is connected to the exhaust passage 32 in a location upstream of the upstream side exhaust catalyst device 41. An electric waste gate valve 62 that controls the exhaust flow rate in the exhaust bypass passage 61 is disposed in the exhaust bypass passage 61. The waste gate valve 62 can bypass a portion of the exhaust gas that is guided to the exhaust turbine 57 to the downstream side of the exhaust turbine 57 and can control the supercharging pressure of the internal combustion engine 10.

A supercharger that can be applied to the present invention is not limited to a so-called electric turbocharger that can rotate the compressor 56 with the electric motor 58, such as the above-described turbocharger 55. A turbocharger 55 from which the electric motor 58 has been omitted, or a mechanical turbocharger (supercharger) in which a compressor disposed in the intake passage 31 is driven by the internal combustion engine 10 may be applied to the present invention.

The control unit 33 is a known digital computer provided with a CPU, ROM, RAM, and an input/output interface.

In addition to the detection signals of the A/F sensor 51, the oxygen sensor 52, and the NOx sensor 53 described above, detection signals of various sensors such as an EVAP pressure sensor 63 for detecting the internal pressure of the canister 38, a crank angle sensor 64 for detecting the crank angle of the crankshaft, and the like, are input to the control unit 33. The crank angle sensor 64 can detect the engine rotational speed of the internal combustion engine 10.

When there is a prescribed power generation request, the control unit 33 drives the internal combustion engine 10 to generate power with the generator 9.

The control unit 33 controls the opening degrees of the throttle valve 34, the purge control valve 37, and the waste gate valve 62.

The control unit 33 controls the operation of the electric motor 58 of the turbocharger 55.

When there is a prescribed power generation request, the control unit 33 drives the internal combustion engine 10 to generate power with the generator 9.

The control unit 33 can estimate the amount of evaporative fuel adsorbed in the canister 38 using the detected value of the EVAP pressure sensor 63. That is, the control unit 33 corresponds to an evaporative fuel amount detection unit for detecting the state of generation of evaporative fuel.

The control unit 33 can use the detected values of the oxygen sensor 52 and the NOx sensor 53 to estimate the amount of HC on the downstream side of the downstream side exhaust catalyst device 42. That is, the control unit 33 corresponds to an HC detection unit for detecting the amount of HC on the downstream side of the downstream side exhaust catalyst device 42.

It is also possible to provide an oxygen sensor and an A/F sensor downstream of the downstream side exhaust catalyst device 42 to estimate the amount of HC on the downstream side of the downstream side exhaust catalyst device 42 using the detected values of these oxygen and A/F sensors.

The internal combustion engine 10 is not operated when power generation by the generator 9 is not required. That is, in the internal combustion engine 10 there are few opportunities to open the purge control valve 37 to purge the evaporative fuel adsorbed in the canister 38 for the introduction thereof into the intake passage 31. Thus, there is the risk of the forced purging of the evaporative fuel in the canister 38 and the introduction thereof into the intake passage 31 during the operation of the internal combustion engine 10.

Since the internal combustion engine 10 is used exclusively for power generation, an operating region that leads to a deterioration in fuel consumption is not used during power generation, and the internal combustion engine is operated at an air-fuel ratio that is leaner than the theoretical air-fuel ratio from the standpoint of enhancing fuel consumption.

When the internal combustion engine 10 operates with an air-fuel ratio that is leaner than the theoretical air-fuel ratio, it is more likely that the exhaust performance and the combustion stability will be adversely affected by the introduction of the evaporative fuel adsorbed in the canister 38, as compared with operation at a rich air-fuel ratio, such as the theoretical air-fuel ratio of the internal combustion engine.

Therefore, in the hybrid vehicle 1 according to the first embodiment, when the internal combustion engine 10 is stopped during operation of the vehicle and a prescribed set of conditions is satisfied, a motor mode for driving the internal combustion engine 10 by means of the generator 9 is executed, and the internal combustion engine 10 to rotates (idles).by means of the generator 9. In other words, when the internal combustion engine 10 is stopped during operation of the vehicle and a prescribed set of conditions is satisfied, the internal combustion engine 10 rotates (idles) by means of the generator 9, with no fuel being to the internal combustion engine 10. That is, the control unit 33 corresponds to a first control unit that causes the generator 9 to rotate (idle) the internal combustion engine 10, when the internal combustion engine 10 is stopped during operation of the hybrid vehicle 1 and a prescribed set of conditions is satisfied. Here, the prescribed set of conditions for rotating the internal combustion engine 10 with the generator 9 may include, for example, the case in which the amount of evaporative fuel adsorbed in the canister 38 is greater than or equal to a prescribed amount, which has been set in advance.

During idling of the internal combustion engine 10 (when motoring the internal combustion engine 10), the hybrid vehicle 1 purges the evaporative fuel adsorbed in the canister 38, the evaporative fuel is introduced into the intake passage 31 via the purge passage 36, and the introduced evaporative fuel is adsorbed in the upstream side exhaust catalyst device 41 and the downstream side exhaust catalyst device 42 as a reducing agent. That is, the control unit 33 corresponds to a second control unit that introduces the evaporative fuel adsorbed in the canister 38 upstream to the upstream side exhaust catalyst device 41, serving as an exhaust purification catalytic converter provided in the exhaust passage 32 of the internal combustion engine 10, when the internal combustion engine 10 is driven the generator 9 in motor mode, and causes the introduced evaporative fuel to be adsorbed in the upstream side exhaust catalyst device 41 and the downstream side exhaust catalyst device 42 as a reducing agent.

In this manner, the hybrid vehicle 1 according to the present invention has the canister 38 that adsorbs the evaporative fuel generated in the fuel tank 35 of the internal combustion engine 10 that can be operated at an air-fuel ratio that is leaner than the theoretical air-fuel ratio, and can drive the drive wheels 2 even when the internal combustion engine 10 is stopped. Then, in the hybrid vehicle 1, when a prescribed set of conditions is satisfied when the internal combustion engine 10 is stopped during vehicle operation, the internal combustion engine 10 is rotated by the generator 9, the evaporative fuel adsorbed in the canister 38 is introduced upstream to the upstream side exhaust catalyst device 41, which is an exhaust purification catalytic converter provided in the exhaust passage 32 of the internal combustion engine 10, via the purge passage 36, and the introduced evaporative fuel is adsorbed in the upstream side exhaust catalyst device 41 and the downstream side exhaust catalyst device 42 as a reducing agent.

At the time that the internal combustion engine 10 is driven by the generator 9 in motor node, the engine rotational speed of the internal combustion engine 10 may be controlled to be a prescribed rotational speed set in advance. This prescribed rotational speed is, for example, a rotational speed at which the introduced evaporative fuel is not discharged to the outside air from the downstream side of the downstream side exhaust catalyst device 42. Specifically, the prescribed rotational speed is, for example, a value that is lower than the engine rotational speed when the internal combustion engine 10 is driven by the generator 9 to generate power. In other words, the above-described prescribed rotational speed is a value that is below the engine rotational speed during power generation mode when the generator 9 is driven by the internal combustion engine 10.

Therefore, in the hybrid vehicle 1, the evaporative fuel is not discharged to the outside even when the evaporative fuel is introduced upstream to the upstream side exhaust catalyst device 41 when the internal combustion engine 10 is rotated by the generator 9, so that it is possible to suppress a deterioration in exhaust performance.

When the evaporative fuel is introduced into the intake passage 31, for example, the opening degree of the throttle valve 34 is adjusted to generate a negative pressure downstream of the throttle valve 34, and the purge control valve 37 is opened. The purge control valve 37 is controlled such that the opening degree increases as the amount of evaporative fuel adsorbed in the canister 38 increases. The opening degree of the purge control valve 37 when the evaporative fuel is introduced into the intake passage 31 may be controlled such that the introduced evaporative fuel is not discharged to the outside air from the downstream side of the downstream side exhaust catalyst device 42.

Therefore, it becomes possible for the hybrid vehicle 1 to supply the evaporative fuel as a reducing agent to the upstream side exhaust catalyst device 41 and the downstream side exhaust catalyst device 42 before the internal combustion engine 10 starts up.

Therefore, the hybrid vehicle 1 is able to suppress a deterioration in combustion stability and exhaust performance of the internal combustion engine 10 caused by the evaporative fuel introduced by means of purging, and to secure exhaust gas purification performance of the upstream side exhaust catalyst device 41 and the downstream side exhaust catalyst device 42 when the internal combustion engine 10 starts (self-sustaining operation). A self-sustaining operation of the internal combustion engine 10 refers to an operating state in which fuel is combusted to generate driving force.

In the upstream side exhaust catalyst device 41 and the downstream side exhaust catalyst device 42, when there is little reducing agent at the time of starting of the internal combustion engine 10, the NOx is not sufficiently processed and the amount of NOx emission is high.

However, in the hybrid vehicle 1, the evaporative fuel is supplied to the upstream side exhaust catalyst device 41 and the downstream side exhaust catalyst device 42 while the internal combustion engine 10 is stopped. Thus, the hybrid vehicle 1 is able to improve the NOx purification performance of the upstream side exhaust catalyst device 41 and the downstream side exhaust catalyst device 42 at the time of starting of the internal combustion engine 10.

When the evaporative fuel is introduced into the intake passage 31 during lean operation in which the air-fuel ratio is controlled to be higher than the theoretical air-fuel ratio, since the variation in the air-fuel ratio is high due to the variation in the amount of evaporative fuel to be introduced, the margin for setting the air-fuel ratio will be wide, and the fuel consumption and the exhaust performance will deteriorate.

However, in the hybrid vehicle 1, since the evaporative fuel is introduced into the intake passage 31 while the internal combustion engine 10 is stopped, it is unlikely that the evaporative fuel will be introduced into the intake passage 31 during lean operation of the internal combustion engine 10. Therefore, in the hybrid vehicle 1, since there is little variation in the amount of evaporative fuel introduced and in the air-fuel ratio, the margin when the air-fuel ratio is set can be relatively narrow, and it is possible to suppress a deterioration in fuel consumption and exhaust performance.

In addition, when the evaporative fuel is introduced into the intake passage 31, it is conceivable to operate the vehicle at a different operating point than that used during lean operation, due to the problem related to margin described above. In this case, the mode fuel consumption deteriorates. Mode fuel consumption is the amount of fuel consumed (fuel consumption) when the vehicle is operated in accordance with a prescribed set of conditions.

However, since it is not necessary to set a dedicated operating point when introducing the evaporative fuel in the hybrid vehicle 1, it is possible to suppress a deterioration of the mode fuel consumption.

In the first embodiment described above, a bypass passage 67 that bypasses the internal combustion engine 10 and that connects the intake passage 31 and the exhaust passage 32 may be provided, as shown by the broken line in FIG. 2. The bypass passage 67 is, for example, connected to the intake passage 31 on the downstream side of the throttle valve 34 and connected to the exhaust passage 32 on the downstream side of the downstream side exhaust catalyst device 42. A bypass valve 68 is provided in the bypass passage 67. For example, the bypass valve 68 is opened if the evaporative fuel is detected downstream of the downstream side exhaust catalyst device 42, when the evaporative fuel is introduced. The opening degree of the bypass valve 68 is controlled by the control unit 33.

Figure 3:
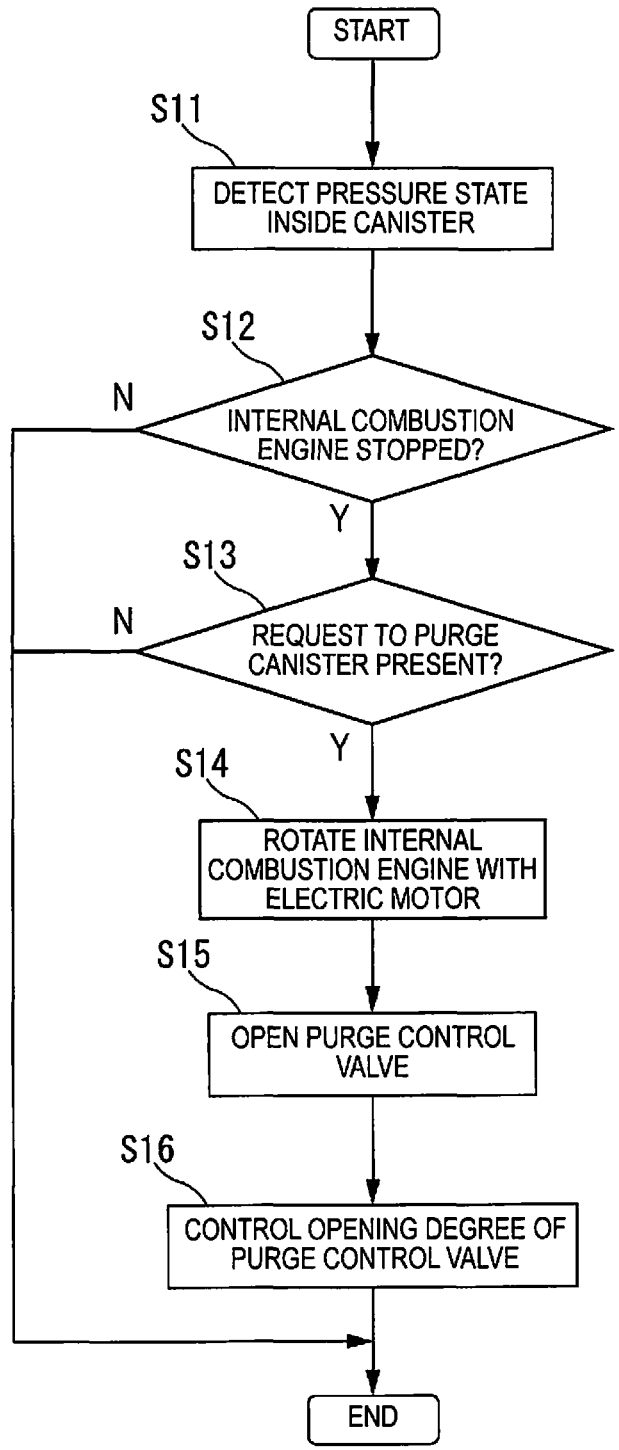
FIG. 3 is a flowchart showing one example of a control flow of the hybrid vehicle in the first embodiment of the present invention.

FIG. 3 is a flowchart showing one example of a control flow of the hybrid vehicle 1 in the first embodiment described above.

In Step S11, the internal pressure of the canister 38 is detected. In Step S12, it is determined whether the internal combustion engine 10 is stopped. If it is determined in Step S12 that the internal combustion engine 10 is stopped, the process proceeds to Step S13. If it is determined in Step S12 that the internal combustion engine 10 is not stopped, the current routine is ended. In Step S13, the amount of evaporative fuel adsorbed in the canister 38 is estimated from the internal pressure of the canister 38, and it is determined that there is a request for purging the canister 38 when the amount of evaporative fuel is greater than or equal to a prescribed amount set in advance. If there is a purge processing request in Step S13, the process proceeds to Step S14. If there is no purge processing request in Step S13, the current routine is ended. In Step S14, the generator 9 rotates the internal combustion engine 10. In Step S15, the purge control valve 37 is opened. In Step S16, the opening degree of the purge control valve 37 is controlled such that the opening degree increases as the amount of evaporative fuel inside the canister 38 increases.

Other embodiments of the present invention will be described below. The same constituent elements as those of the first embodiment have been assigned the same reference numerals and redundant descriptions have been omitted.

The second embodiment of the present invention will now be described. In the second embodiment the opening degree of the purge control valve 37 and the engine rotational speed of the internal combustion engine 10 are controlled such that the introduced evaporative fuel is not discharged to the outside air from the downstream side of the downstream side exhaust catalyst device 42 as in the first embodiment described above. Accordingly, the system configuration of the internal combustion engine 10 in the second embodiment is the same as that of the first embodiment described above.

Figure 4:
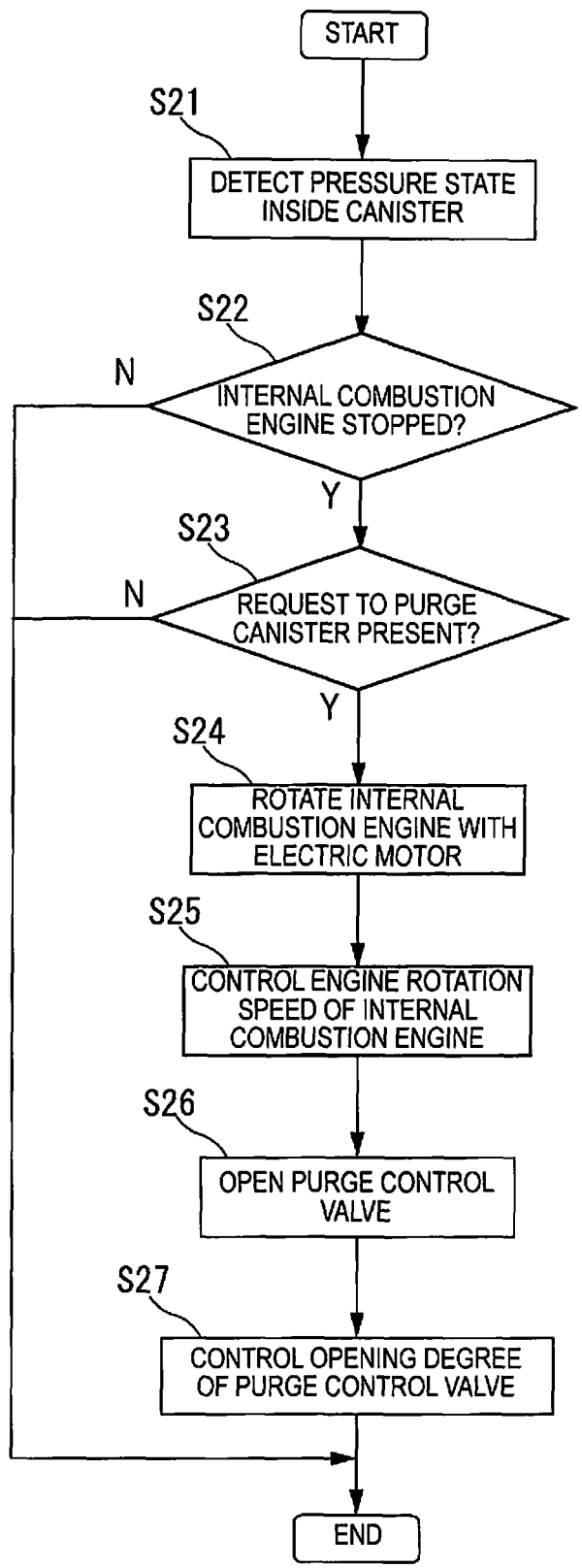
FIG. 4 is a flowchart showing one example of a control flow of the hybrid vehicle in a second embodiment of the present invention.

FIG. 4 is a flowchart showing one example of the control flow of the hybrid vehicle 1 of the second embodiment.

In Step S21, the internal pressure of the canister 38 is detected. In Step S22, it is determined whether the internal combustion engine 10 is stopped. If it is determined in Step S22 that the internal combustion engine 10 is stopped, the process proceeds to Step S23. If it is determined in Step S22 that the internal combustion engine 10 is not stopped, the current routine is ended. In Step S23, the amount of evaporative fuel adsorbed in the canister 38 is estimated from the internal pressure of the canister 38, and it is determined that there is a request for purging the canister 38 when the amount of evaporative fuel is greater than or equal to a prescribed amount set in advance. If there is a purge processing request in Step S23, the process proceeds to Step S24. If there is no purge processing request in Step S23, the current routine is ended. In Step S24, the generator 9 rotates the internal combustion engine 10. In Step S25, the engine rotational speed of the internal combustion engine 10 when rotated by the generator 9 is controlled such that the introduced evaporative fuel is not discharged to the outside air from the downstream side of the downstream side exhaust catalyst device 42. In Step S26, the purge control valve 37 is opened. In Step S27, the opening degree of the purge control valve 37 is controlled such that the introduced evaporative fuel is not discharged to the outside air from the downstream side of the downstream side exhaust catalyst device 42.

Even in this second embodiment, essentially the same action and effects as the first embodiment can be achieved.

In addition, in the second embodiment, it is possible to suppress the discharge of the introduced evaporative fuel from the exhaust passage 32 to the outside.

In the second embodiment shown in FIG. 4, either the engine rotational speed of the internal combustion engine 10 or the opening degree of the purge control valve 37 may be controlled such that the evaporative fuel is not discharged to the outside air from the downstream side of the downstream side exhaust catalyst device 42. That is, either Step S23 or Step S26 may be omitted from the flowchart shown in FIG. 4.

The third embodiment of the present invention will now be described. In the third embodiment, the fourth catalytic converter 46, which is an electric heating catalytic converter, is energized when introducing the evaporative fuel, in the first embodiment described above. Accordingly, the system configuration of the internal combustion engine 10 in the third embodiment is the same as that of the first embodiment described above.

Figure 5:
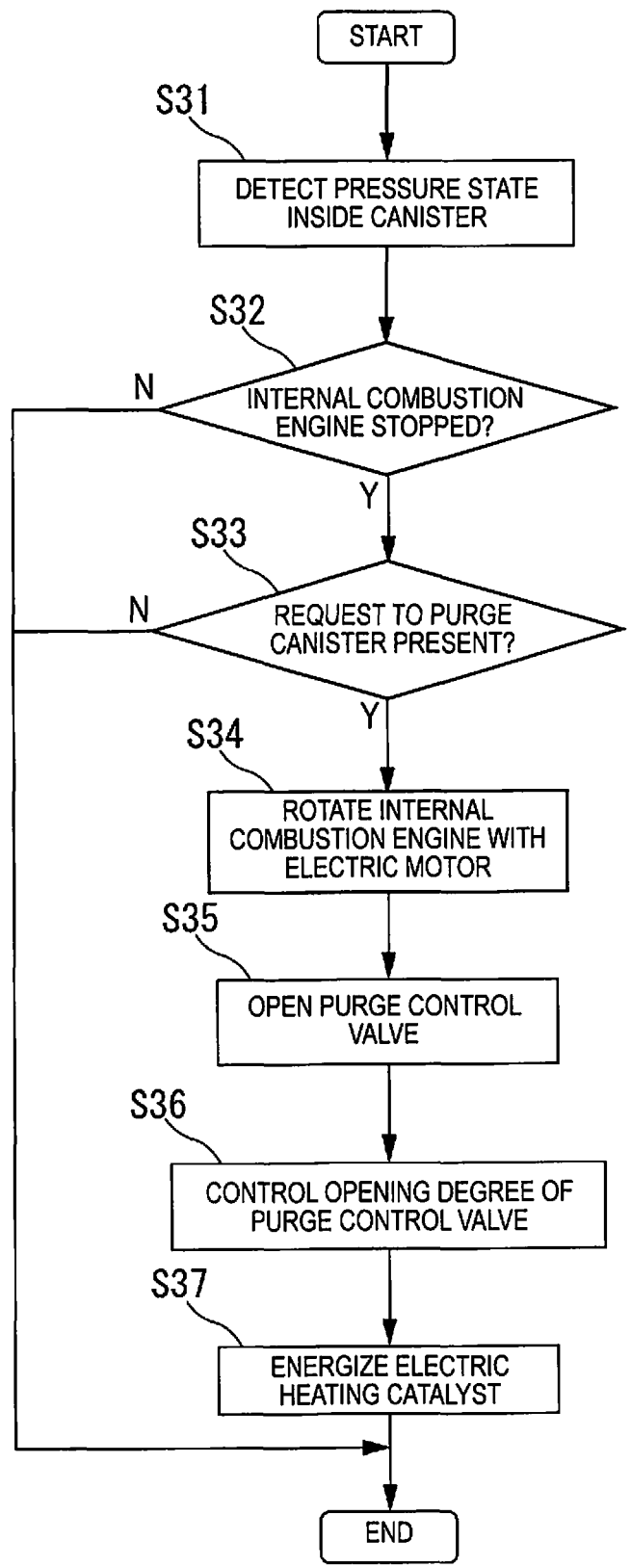
FIG. 5 is a flowchart showing one example of a control flow of the hybrid vehicle in a third embodiment of the present invention.

FIG. 5 is a flowchart showing one example of a control flow of the hybrid vehicle 1 in the third embodiment.

In Step S31, the internal pressure of the canister 38 is detected. In Step S32, it is determined whether the internal combustion engine 10 is stopped. If it is determined in Step S32 that the internal combustion engine 10 is stopped, the process proceeds to Step S33. If it is determined in Step S32 that the internal combustion engine 10 is not stopped, the current routine is ended. In Step S33, the amount of evaporative fuel adsorbed in the canister 38 is estimated from the internal pressure of the canister 38, and it is determined that there is a request for purging the canister 38 when the amount of evaporative fuel is greater than or equal to a prescribed amount set in advance. If there is a purge processing request in Step S33, the process proceeds to Step S34. If there is no purge processing request in Step S33, the current routine is ended. In Step S34, the generator 9 rotates the internal combustion engine 10. In Step S35, the purge control valve 37 is opened. In Step S36, the opening degree of the purge control valve 37 is controlled such that the opening degree increases as the amount of evaporative fuel inside the canister 38 increases. In Step S37, the fourth catalytic converter 46, which is an electric heating catalytic converter, is energized.

Even in this third embodiment, essentially the same action and effects as those of the first embodiment can be achieved.

In addition, in the third embodiment, by energizing the fourth catalytic converter 46, which is an electric heating catalytic converter, to preheat the fourth catalytic converter 46, it is possible to purify the NOx adsorbed on the fifth catalytic converter 47, which is an NOx trap catalytic converter, with the introduced evaporative fuel.

If the fifth catalytic converter 47 constituting the first catalytic converter 43 is a three-way catalytic converter, by energizing the fourth catalytic converter 46, which is an electric heating catalytic converter, to preheat the fourth catalytic converter 46, it is possible to activate the fifth catalytic converter 47, which is a three-way catalytic converter, in order to purify the NOx with the introduced evaporative fuel.

In addition, since it is possible to suppress the overall temperature of the upstream side exhaust catalyst device 41 by energizing the fourth catalytic converter 46, it is possible to quickly raise the temperature of the upstream side exhaust catalyst device 41 to the activation temperature at the time of starting the internal combustion engine 10.

The fourth embodiment of the present invention will now be described. In the fourth embodiment, the bypass passage 67 and the bypass valve 68 are provided in the first embodiment described above. Accordingly, the system configuration of the internal combustion engine 10 in the fourth embodiment is the same as that of the first embodiment described above.

In the fourth embodiment, evaporative fuel that did not adhere to the upstream side exhaust catalyst device 41 and the downstream side exhaust catalyst device 42 is returned to the intake passage 31 via the bypass passage 67 such that the evaporative fuel is not discharged to the outside.

The evaporative fuel that has flowed out to the downstream side of the downstream side exhaust catalyst device 42 can be returned to the intake passage 31 by controlling the opening degree of the throttle valve 34 to generate a negative pressure on the downstream side of the throttle valve 34.

Figure 6:
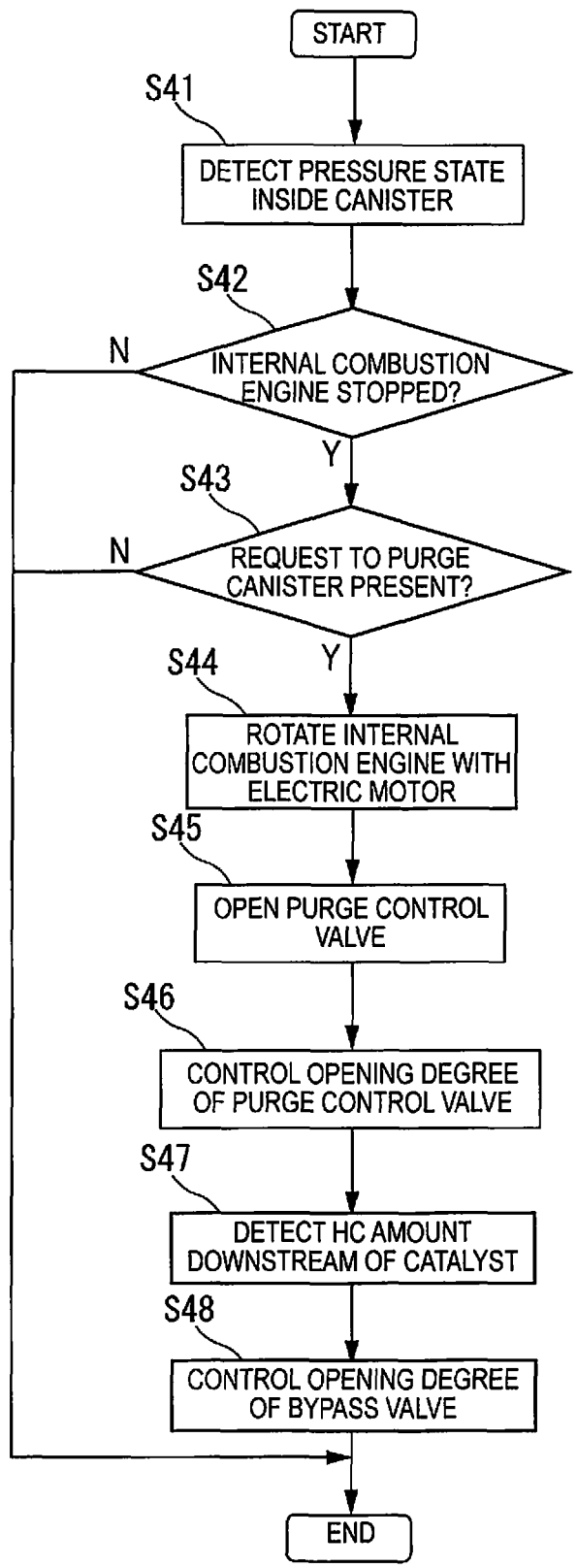
FIG. 6 is a flowchart showing one example of a control flow of the hybrid vehicle in a fourth embodiment of the present invention.

FIG. 6 is a flowchart showing one example of the control flow of the hybrid vehicle 1 of the fourth embodiment.

In Step S41, the internal pressure of the canister 38 is detected. In Step S42, it is determined whether the internal combustion engine 10 is stopped. If it is determined in Step S42 that the internal combustion engine 10 is stopped, the process proceeds to Step S43. If it is determined in Step S42 that the internal combustion engine 10 is not stopped, the current routine is ended. In Step S43, the amount of evaporative fuel adsorbed in the canister 38 is estimated from the internal pressure of the canister 38, and it is determined that there is a request for purging the canister 38 when the amount of evaporative fuel is greater than or equal to a prescribed amount set in advance. If there is a purge processing request in Step S43, the process proceeds to Step S44. If there is no purge processing request in Step S43, the current routine is ended. In Step S44, the generator 9 rotates the internal combustion engine 10. In Step S45, the purge control valve 37 is opened. In Step S46, the opening degree of the purge control valve 37 is controlled such that the opening degree increases as the amount of evaporative fuel inside the canister 38 increases. In Step S47, the amount of HC downstream of the downstream side exhaust catalyst device 42 is detected. In Step S48, the opening degree of the bypass valve 68 is controlled in accordance with the amount of HC downstream of the downstream side exhaust catalyst device 42. For example, if HC is not detected downstream of the downstream side exhaust catalyst device 42, the bypass valve 68 is closed. In addition, if HC is detected downstream of the downstream side exhaust catalyst device 42, the opening degree of the bypass valve 68 is increased proportionally with the amount of detected increase of the HC.

Even in this fourth embodiment, essentially the same action and effects as those of the first embodiment can be achieved.

In addition, in the fourth embodiment, the evaporative fuel that was not adsorbed by the upstream side exhaust catalyst device 41 and the downstream side exhaust catalyst device 42 is returned to the intake passage 31, so that it is possible to suppress the discharge of the introduced evaporative fuel from the exhaust passage 32 to the outside.

Figure 7:
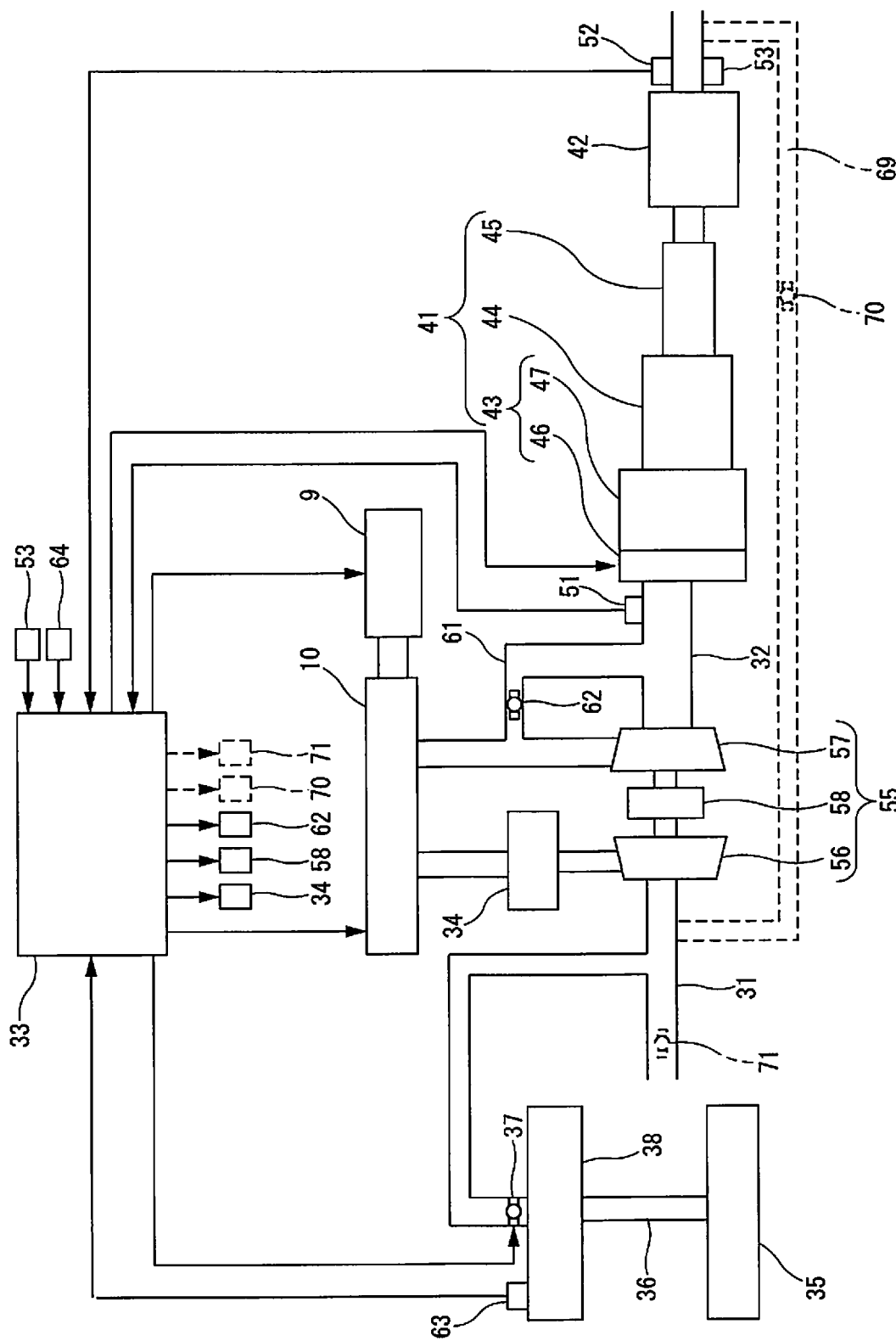
FIG. 7 is an explanatory diagram schematically illustrating an outline of a system configuration of an internal combustion engine mounted in a hybrid vehicle of a fifth embodiment of the present invention.

The fifth embodiment of the present invention will now be described with reference to FIG. 7. FIG. 7 is an explanatory diagram schematically illustrating the system configuration of the internal combustion engine 10 of the fifth embodiment. The fifth embodiment has essentially the same configuration as the first embodiment described above, but the purge passage 36 is connected to the intake passage 31 on the upstream side of the compressor 56.

When the evaporative fuel is introduced into the intake passage 31 in this fifth embodiment, for example, the electric motor 58 is used to rotate the compressor 56 to generate a negative pressure upstream to the compressor 56, and the purge control valve 37 is opened.

Even in this fifth embodiment, when the internal combustion engine 10 is stopped during operation of the vehicle, the internal combustion engine 10 can be idled by the generator 9, and the evaporative fuel adsorbed in the canister 38 can be introduced upstream to the upstream side exhaust catalyst device 41, which is an exhaust purification catalytic converter provided in the exhaust passage 32 of the internal combustion engine 10, via the purge passage 36. Thus, also in this fifth embodiment, the introduced evaporative fuel can be adsorbed in the upstream side exhaust catalyst device 41 and the downstream side exhaust catalyst device 42 as a reducing agent.

Therefore, even in this fifth embodiment, essentially the same action and effects as those of the first embodiment can be achieved.

In the fifth embodiment, a bypass passage 69 that bypasses the internal combustion engine 10 and that connects the intake passage 31 and the exhaust passage 32 may be provided, as indicated by the broken line in FIG. 7. The bypass passage 69 is, for example, connected to the intake passage 31 on the upstream side of the compressor 56 and connected to the exhaust passage 32 on the downstream side of the downstream side exhaust catalyst device 42. A bypass valve 70 is provided in the bypass passage 69. For example, the bypass valve 70 is opened if the evaporative fuel is detected downstream of the downstream side exhaust catalyst device 42, when the evaporative fuel is introduced. The opening degree of the bypass valve 70 is controlled by the control unit 33.

Additionally, in the fifth embodiment, a second throttle valve 71 serving as a control valve may be provided upstream of the connection position between the purge passage 36 and the intake passage 31, or the connection position between the bypass passage 67 and the intake passage 31.

By using the bypass passage 69, the evaporative fuel that did not adhere to the upstream side exhaust catalyst device 41 and the downstream side exhaust catalyst device 42 can be returned to the intake passage 31 such that the evaporative fuel is not discharged to the outside.

The evaporative fuel that has flowed out to the downstream side of the downstream side exhaust catalyst device 42 can be returned to the intake passage 31 by rotating the compressor 56 with the electric motor 58, for example, to generate a negative pressure on the upstream side of the compressor 56. The rotation of the electric motor 58 is controlled by the control unit 33.

In addition, the evaporative fuel that has flowed out to the downstream side of the downstream side exhaust catalyst device 42 can also be returned to the intake passage 31 by controlling the opening degree of the second throttle valve 71 to generate a negative pressure on the downstream side of the second throttle valve 71. The opening degree of the second throttle valve 71 may be controlled by the control unit 33.

That is, by using the bypass passage 69, the evaporative fuel that was not adsorbed by the upstream side exhaust catalyst device 41 and the downstream side exhaust catalyst device 42 can be returned to the intake passage 31, so that it is possible to suppress the discharge of the introduced evaporative fuel from the exhaust passage 32 to the outside.

Further, an EGR passage may be used as the bypass passages 67, 69. That is, the bypass passages 67, 69 may be EGR passages that recirculate a portion of the exhaust of the internal combustion engine 10 to the intake passage 31. In this case, an EGR control valve that is provided in the EGR passage and controls the amount of exhaust recirculation corresponds to the bypass valves 67, 68.

Moreover, the present invention can be applied to a hybrid vehicle other than the above-described series hybrid vehicle (for example, to a so-called parallel hybrid vehicle). In other words, the present invention can be applied to a hybrid vehicle that can drive the drive wheels 2 for vehicle travel even if the internal combustion engine 10 is stopped.

The above-described embodiments relate to the hybrid vehicle control method and hybrid vehicle control device.

The invention claimed is:

1. A hybrid vehicle control method for a hybrid vehicle that has a canister that adsorbs evaporative fuel generated in a fuel tank of an internal combustion engine, and that is capable of driving a drive wheel even when the internal combustion engine is stopped, the hybrid vehicle control method comprising:
   upon determining that a prescribed set of conditions is satisfied while fuel-combustion operation of the internal combustion engine is stopped during operation of the hybrid vehicle, executing a control to cause an electric motor connected to the internal combustion engine to rotate the internal combustion engine while introducing the evaporative fuel adsorbed in the canister to an upstream side of an exhaust purification catalytic converter provided in an exhaust passage of the internal combustion engine, thereby causing the introduced evaporative fuel to be adsorbed by the exhaust purification catalytic converter as a reducing agent,
   during the control causing the electric motor to rotate the internal combustion engine, an engine rotational speed of the internal combustion engine being controlled to a prescribed rotational speed lower than a rotational speed of the internal combustion engine used when the internal combustion engine is operated to drive the electric motor in a power generation mode, the prescribed rotational speed being set such that the evaporative fuel is not discharged outside via the exhaust passage,
   the control being executed before the internal combustion engine is restarted to resume the fuel-combustion operation.

2. The hybrid vehicle control method according to claim 1, further comprising
   detecting a pressure of the canister to estimate a state of generation of evaporative fuel, and
   rotating the internal combustion engine by the electric motor and introducing the evaporative fuel adsorbed in the canister upstream of the catalytic converter, upon determining an amount of the evaporative fuel adsorbed in the canister is greater than or equal to a prescribed amount set in advance.

3. The hybrid vehicle control method according to claim 1, wherein
   the introducing the evaporative fuel adsorbed in the canister upstream to the catalytic converter being executed via a purge passage equipped having a purge control valve, and the method further comprising
   detecting a pressure of the canister to estimate a state of generation of the evaporative fuel, and
   rotating the internal combustion engine by the electric motor and increasing an opening degree of the purge control valve proportionally with an amount of the evaporative fuel adsorbed in the canister in order to introduce the evaporative fuel adsorbed in the canister upstream to the catalytic converter, upon determining an amount of the evaporative fuel adsorbed in the canister is greater than or equal to a prescribed amount set in advance.

4. The hybrid vehicle control method according to claim 1, wherein
   the catalytic converter includes an electric heating catalytic converter that generates heat when energized, and
   when the internal combustion engine is rotated by the electric motor and the evaporative fuel adsorbed in the canister is introduced upstream of the catalytic converter, electric power is supplied to the electric heating catalytic converter to activate the catalytic converter, and the introduced evaporative fuel is used to purify NOx that is adsorbed in the catalytic converter.

5. The hybrid vehicle control method according to claim 4, wherein
   the catalytic converter includes a three-way catalytic converter downstream of the electric heating catalytic converter.

6. The hybrid vehicle control method according to claim 4, wherein
   the catalytic converter includes an NOx trap catalytic converter downstream of the electric heating catalytic converter.

7. The hybrid vehicle control method according to claim 1, wherein
   a throttle valve is disposed in an intake passage of the internal combustion engine,
   the evaporative fuel adsorbed in the canister is introduced into the intake passage from the downstream side of the throttle valve, and when the evaporative fuel adsorbed in the canister is introduced into the intake passage, the throttle valve generates negative pressure downstream of the throttle valve.

8. The hybrid vehicle control method according to claim 1, wherein
the internal combustion engine is equipped with a supercharger,
a compressor of the supercharger and a control valve positioned upstream of the compressor are disposed in the intake passage of the internal combustion engine,
the evaporative fuel adsorbed in the canister is introduced into the intake passage between the control valve and the compressor, and
when the evaporative fuel adsorbed in the canister is introduced into the intake passage, the control valve generates a negative pressure in the control valve and the compressor.

9. The hybrid vehicle control method according to claim 1, wherein
the internal combustion engine is equipped with a supercharger,
the supercharger has a compressor disposed in an intake passage of the internal combustion engine and a supercharger electric motor that can rotationally drive the compressor,
the evaporative fuel adsorbed in the canister is introduced into the intake passage from the upstream side of the compressor, and
when the evaporative fuel adsorbed in the canister is introduced into the intake passage, the supercharger electric motor rotates the compressor in order to generate a negative pressure on the upstream side of the compressor.

10. The hybrid vehicle control method according to claim 1, wherein
the internal combustion engine has a bypass passage capable of returning the introduced evaporative fuel from the downstream side of the catalytic converter to the intake passage of the internal combustion engine,
the bypass passage is provided with a bypass valve that opens and closes the bypass passage,
an HC detection unit that can detect the amount of HC (hydrocarbon) is provided in the exhaust passage downstream of the catalytic converter, and
the opening degree of the bypass valve is controlled in accordance with the amount of HC detected by the HC detection unit to recirculate the HC on the downstream side of the catalytic converter to the intake passage.

11. The hybrid vehicle control method according to claim 10, wherein
the bypass passage is an EGR passage that recirculates a portion of the exhaust of the internal combustion engine to the intake passage, and
the bypass valve is an EGR control valve that controls the amount of the exhaust recirculated to the intake passage.

12. A hybrid vehicle control device for a hybrid vehicle that is capable of driving a drive wheel even when an internal combustion engine is stopped, the hybrid vehicle control device comprising:
an electric motor configured to rotate the internal combustion engine;
an exhaust purification catalytic converter provided in an exhaust passage of the internal combustion engine;
a canister configured to adsorb evaporative fuel generated in a fuel tank of the internal combustion engine; and
a control unit configured such that upon determining that a prescribed set of conditions is satisfied while fuel-combustion operation of the internal combustion engine is stopped during operation of the hybrid vehicle, the control unit executes a control to
cause the electric motor to rotate the internal combustion engine at a prescribed rotational speed lower than a rotational speed of the internal combustion engine during a power generation mode in which the internal combustion engine drives the electric motor as a generator, and
introduce the evaporative fuel adsorbed in the canister to an upstream side of the exhaust purification catalytic converter such that the evaporative fuel that was introduced is adsorbed by the exhaust purification catalytic converter as a reducing agent while the electric motor rotates the internal combustion engine,
the control unit setting the prescribed rotational speed such that the evaporative fuel is not discharged outside via the exhaust passage, and
the control unit being configured to execute the control before the internal combustion engine is restarted from the stopped state to resume the fuel-combustion operation.

* * * * *